United States Patent [19]

Sgarbi et al.

[11] Patent Number: 5,394,513
[45] Date of Patent: Feb. 28, 1995

[54] PROCESS FOR GENERATING A TRAJECTORY FOR A ROBOTIZED SYSTEM

[75] Inventors: Frédéric Sgarbi, Paris; Riadh Cammoun, Antony, both of France

[73] Assignee: Commissariat A l'Energie Atomique, Paris, France

[21] Appl. No.: 967,855

[22] Filed: Oct. 28, 1992

[30] Foreign Application Priority Data

Oct. 28, 1991 [FR] France ................ 91 13250

[51] Int. Cl.⁶ .......................................... G05B 19/42
[52] U.S. Cl. ..................................................... 395/80
[58] Field of Search ................. 395/80, 83, 99, 85, 395/88, 87, 93, 95, 96

[56] References Cited

U.S. PATENT DOCUMENTS

| | | | |
|---|---|---|---|
| 3,748,563 | 7/1973 | Pomella et al. | 318/573 |
| 4,035,706 | 7/1977 | Cutler | 318/572 |
| 4,150,329 | 4/1979 | Dahlstrom | 395/80 |
| 4,529,921 | 7/1985 | Moribe | 395/87 |
| 4,598,380 | 7/1986 | Holmes et al. | 395/83 |
| 4,988,934 | 1/1991 | Toyoda et al. | 395/99 |

FOREIGN PATENT DOCUMENTS 0354057 10/1989 European Pat. Off. .

OTHER PUBLICATIONS

Wu et al, "Design of a Controlled Spatial Curve Trajectory for Robot Manipulators", Proc of 27th Conf on Decision and Control, pp. 161-166 vol. 1, Dec. 7-9, 1988.

Bobrow et al, "Time Optimal Control of Robotic Manipulators Along Specified Paths" Int'l Journal of Robotics Research, No. 3 pp. 3-17, 1985.

Pfeiffer & Johanni (1986) "A concept for manipulator trajectory planning" Proceedings IEEE International Conference on Robotics and Automation, pp. 1399-1405.

Angeles et al. (1988) "Trajectory planning in robotics continuous-path applications" IEEE Journal of Robotics and Automation, pp. 380-385.

*Primary Examiner*—Allen R. MacDonald
*Assistant Examiner*—Stuart B. Shapiro
*Attorney, Agent, or Firm*—Burns, Doane, Swecker & Mathis

[57] ABSTRACT

Process for generating a trajectory for a robotized system comprising at least one member and making it possible to vary the speed of the movement in real time.

The process consists of choosing a main movement, e.g. the translation movement of the member and all the other movements are dependent thereon. The main movement takes place on the trajectory broken down into a section having a speed ensuring the possibility of stopping the member at the end of the section following that which has been covered. The dependent movements are covered in synchronized manner with the main movement to the extent that this is possible.

The invention can e.g. apply to the automatic trimming or deburring of parts having a complex shape. It is possible to envisage robotized systems formed from several independently mobile solids coordinated by the process, or several control dependency instructions.

6 Claims, 3 Drawing Sheets

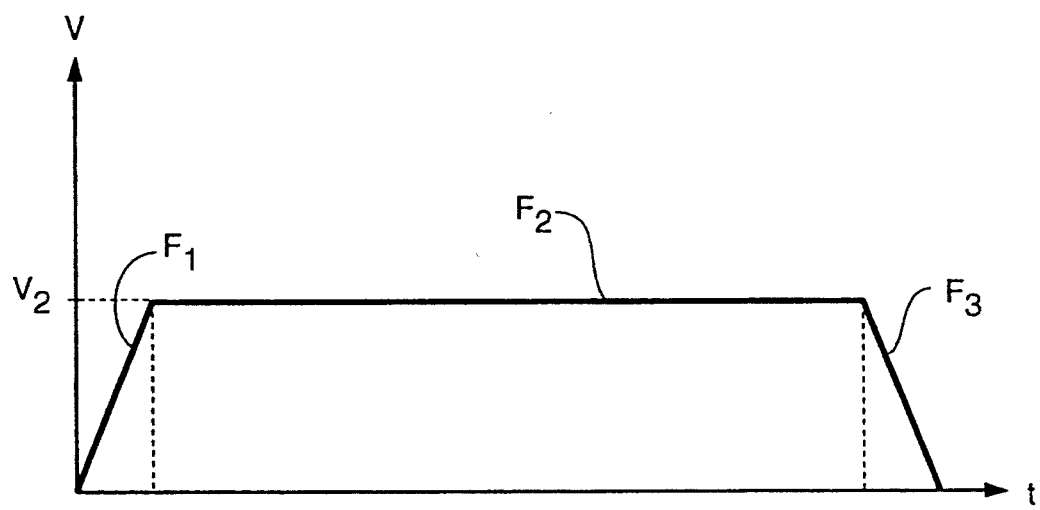
FIG._1
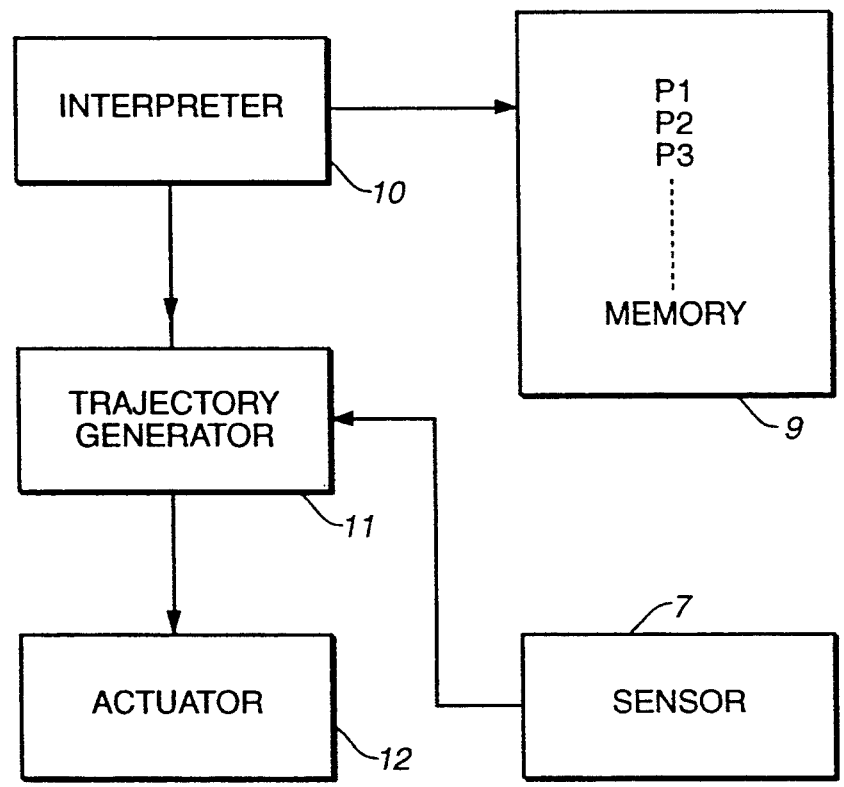
FIG._5

PROCESS FOR GENERATING A TRAJECTORY FOR A ROBOTIZED SYSTEM

BACKGROUND AND SUMMARY

The invention relates to a process for generating a trajectory for a robotized system comprising a random number of mobile members participating in the accomplishment of the trajectory.

The trajectories of industrial robots are defined by successions of sections or portions joined by passage points where the system is in a given state. It very frequently occurs that in reality the trajectory results from the superimposing of several movements performed by different mobile members or by the same mobile member. An elementary example is that of a working tool such as a grinding wheel or milling cutter at the end of a robot arm. One of the movements is the displacement of the cutter or its centre on a curvilinear trajectory and another movement is its orientation. These movements are accomplished in an almost uncoupled manner by the robot arm and by the rotation of the wrist at the end of said arm.

Certain inadequacies of the conventional trajectory generation processes restrict the capacities of robotized systems. The method normally used for generating trajectories consists of defining the travel speed of the section for each movement. The movements then comprise an acceleration phase, a constant speed phase and a deceleration phase. With this method it is not possible to vary the speed of the movement in real time. It is also necessary to carry out preliminary calculations in order to define the travel times of the three phases, as well as the distances of portions of corresponding travels as a function of authorized acceleration and deceleration values. These calculations must be carried out once and for all and it is not possible to repeat them when the travel of the trajectory has been commenced, which means that it is impossible to modify the speed and that the movement is consequently fixed from the outset.

FIG. 1 summarizes this trajectory generating mode. It consists of a speed diagram as a function of time and the three successive phases are designated F1, F2 and F3, the slopes of F1 and F3 being imposed in the same way as V2 (maximum acceleration, deceleration and speed).

The invention relates to an improved process more particularly making it possible to automatically generate a trajectory in direct time, i.e., whose advance speed is not necessarily known beforehand and which can e.g., be controlled by a sensor preceding the working tool and which indicates the presence or size of a burr. For this purpose one of the movements is a main movement for which each section is traversed at a speed limited as a function of an acceleration and a deceleration of a maximum nature associated with the main movement and the other movements so as not to exceed a maximum speed at the end of the section presently being covered, the maximum speed being calculated in such a way as to be able to stop the mobile members, whose robotized system is composed at the end of the following section and in that the other movements are dependent on the main movement and are covered at variable speeds calculated as a function of the variable speed on the main movement so that all the movements simultaneously lead to the end of each section, i.e. terminate together. The maximum acceleration and deceleration, which can be chosen by the system designer, permit flexible movements and serve as a mechanical filter for excessively sudden variations of controls.

The speeds of the dependent movements can naturally be calculated in such a way that the proportion of the section covered by each of said dependent movements converges towards the section proportion covered at the same instant by the main movement, or a maximum acceleration or deceleration until the said proportions coincide.

BRIEF DESCRIPTION OF THE DRAWINGS

The invention is described in greater detail hereinafter relative to non-limitative embodiments and with reference to the attached drawings, wherein show:

FIG. 1: The performance of a trajectory generation according to the prior art.

FIG. 5: The way of obtaining the rotary movement.

DETAILED DESCRIPTION

Figure 2:
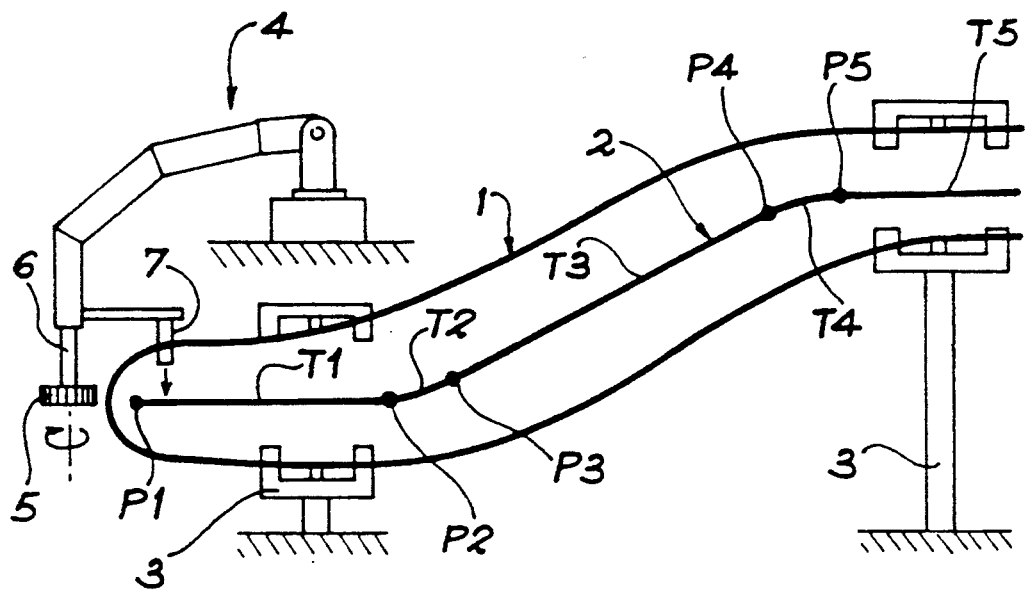
FIG. 2: An example of application of the invention.
Figure 3:
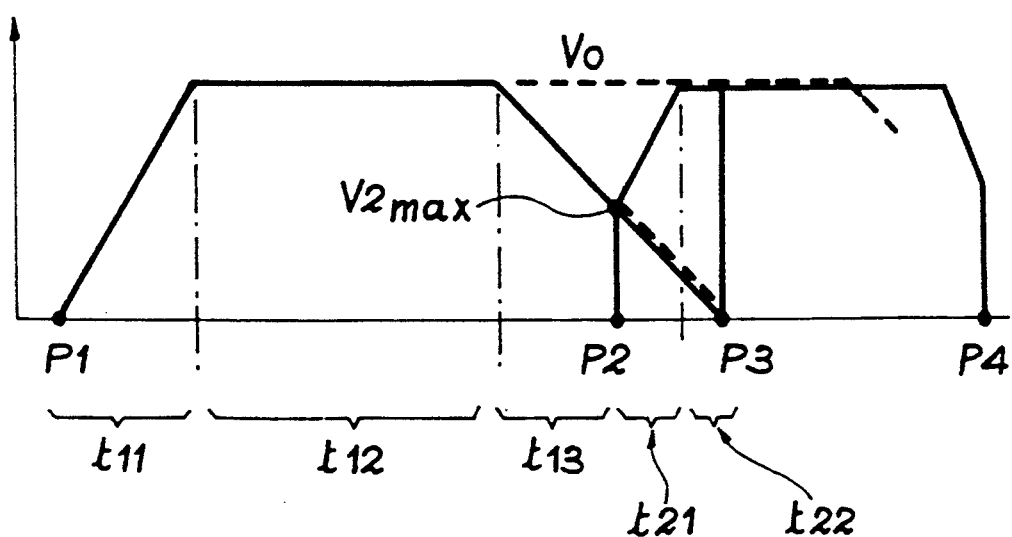
FIG. 3: The method of obtaining the main movement of the trajectory.

FIG. 2 shows a sinuous part 1 obtained by moulding, which has led to the appearance of a burr 2 which should be removed. It is assumed that the burr 2 is connected to the part 1 and this extends in the plane of the drawing and is formed by two horizontal portions of different level separated by a transition portion. The part 1 is clamped and kept fixed relative to the ground by vices 3. A robot 4, whose arm is visible, carries a tool 5, which can be a grinding wheel or a milling cutter and which rotates about a shaft 6. The tool 5 must be moved along the base of the burr 2 and the shaft 6 must as far as possible remain perpendicular to the direction of the portion undergoing deburring. Therefore these conditions define two different movements of the tool 5. The trajectory is known beforehand, but it is possible to vary the travel speed in real time by means of a sensor 7, which precedes the tool 5 and evaluates the width or thickness of the burr. A simple example of such a sensor is given in French patent 2 649 630.

The burr 2 (and the trajectory) can consequently be broken down in said example into three main, rectilinear sections, namely a first horizontal section T1, an oblique section T3 and a second horizontal section T5. These three rectilinear sections are successively connected by two circular arc or connecting sections T2 and T4. The sections T consequently form an uninterrupted chain and are connected by passage points P, P1 being the starting point of the section T1, P2 of the section T2, etc. and reciprocally each section T is terminated on the following passage point P. It is clear that modifications to the displacement speed of the tool 5 must be introduced in order to limit the cutting force when the burr grows, because burrs can have significant, unforecastable thickness or width variations, which make it necessary to cover the sections at different advance speeds. However, this situation (which would, e.g., involve subdividing the rectilinear sections) is not illustrated, because the performance of the process remains the same.

The linear displacement movement defined by the Cartesian coordinates of the tool 5 is chosen as the main or master movement. Every effort is made to cover it as quickly as possible as a function of constraints which will be described in connection with FIG. 5 to which reference will subsequently be made.

The control system of the arm 4 essentially comprises an interpreter 10, which reads the content of the program memory 9 and transmits the decoded instructions to a trajectory generator 11 in the form of data usable by the latter and actuators 12, which control the movements of the articulations of the arm 4 and which is controlled by the trajectory generator 11.

The program memory 9 contains the instructions necessary for describing the evolution of the robotized system at each passage point P, i.e., the coordinates of the position of these points, the orientation which the tool 5 must have and the informations relating to the intermediate sections and in particular their rectilinear, circular or other shape. The interpreter 10 is programmed in such a way as to read and transmit the informations relating to a section as soon as the preceding section starts to be covered. For example, the informations relating to T3 and P3 are known when the tool 5 arrives at the starting point P1 or immediately thereafter.

Firstly calculation takes place of a maximum speed, in this case $V2_{max}$, at the end P2 of the section T1 which is on the point of being covered. This speed is calculated in such a way that it is possible to stop the tool 5 at the end of the following section T2 at the point P3, because the robotized system ignores whether this point will not be the final point of the trajectory and it is necessary to ensure any passing beyond the ends of the trajectory with the unforecastable consequences resulting therefrom. As there is a maximum acceleration and deceleration (in principle the same in absolute values), which are imposed beforehand by the mechanical design of the robot arm 4, or for safety reasons, or for maintaining the coordination of the different articulation movements, $V2_{max}$ cannot exceed the speed which would correspond to stopping at point P3 by a maximum deceleration movement.

Once $V2_{max}$ has been calculated, every effort is made to clear the section T1 at a speed compatible with the dimensions of the burr, designated VO and this speed can vary in real time. The sensor 7 will give the information necessary for optimizing VO and the first passage phase consists of covering the section T1 at maximum acceleration until said speed is reached. As the section T1 is relatively long, it is a priori possible to reach a speed VO by accelerating from the speed at point P1 (zero in the present case) for the time t11.

The second phase, covered during the time t12, is at speed VO, but a check is made at each machine operating cycle and as soon as the control system notes that it is necessary to decelerate in order not to exceed the speed $V2_{max}$ at point P2, it does so and the final stage is consequently a maximum deceleration stage from VO to $V2_{max}$ performed during the time t13. If VO is below $V2_{max}$, said deceleration will not be initiated.

The information relating to the section T3 and the point P4 are read when the passage through the section T2 commences. As the section T3 is relatively long, the control system notes that there is sufficient time to stop the tool 5 at point P4, even if the point P3 is reached at the maximum speed VO. Therefore the section T2 is firstly covered at maximum acceleration during the time t21 until the speed of the tool 5 reaches the maximum speed VO, which is then maintained for the time t22 up to the point P3. If the section T2 had been even shorter, the speed VO would not have been reached and it could have been entirely covered with the maximum acceleration. The movement then continues. It is found that it is in practice covered at an average speed relatively close to the maximum speed, which would not have been the case if it was necessary to stop the tool 5 at each passage point P.

Figure 4:
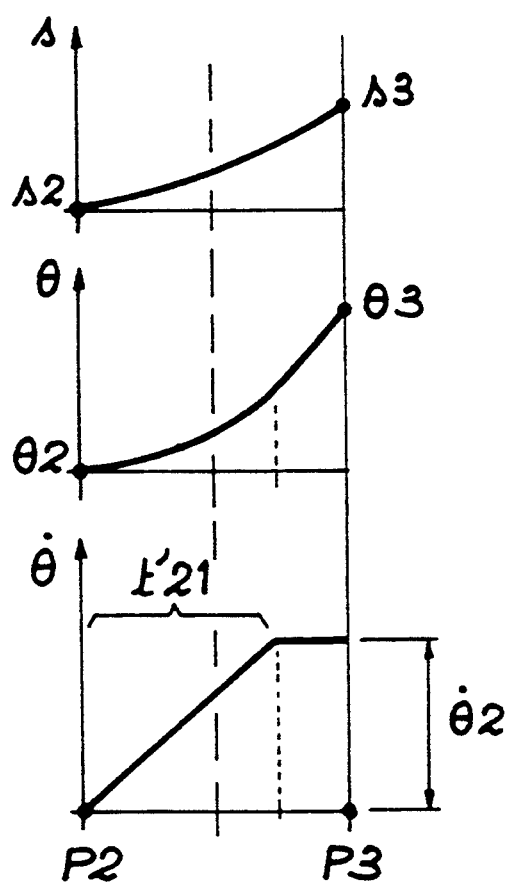
FIG. 4: A movement synchronization diagram.

The other movements of the system, namely in this case the orientation movement of the tool 5, are dependent as regards speed on that of the master movement. Therefore no attempt is made to perform them at the maximum speed, which would be possible, but would make it necessary to synchronize them with the main movement. Thus, during the covering of the section T2, on designating by s2 and s3 the curvilinear abscissas of the tool 5 on the trajectory at the points P2 and P3 and by si the curvilinear abscissa at the intermediate point, as well as by $\theta 2$, $\theta 3$ and $\theta i$ the orientations of the tool 5 at these same points or instants, every effort is made to respect the condition $(s3-si)/(s3-s2)=(\theta 3-\theta i)/(\theta 3-\theta 2)$, i.e., each of the movements on the same section must be covered with an identical proportion at the same time. However, on some occasions this condition cannot be respected, because the average speed variations of dependent movements between individual sections often make it necessary to exceed the maximum speed authorized for these movements. Thus, the rotation speed of the orientation of the tool 5, which is synchronized with VO on most of the section T1, must be modified on the section T2. If the radius of curvature is sufficiently small, it is only possible to reach a uniform speed $\theta 2$ after a phase of duration $t'21$ (illustrated in FIG. 4) which is longer than t21 during which the rotation speed $\theta$ of the tool 5 varies at the maximum acceleration. It is only towards the end of the section T2 that the synchronization condition is reestablished. This condition is always reached at least at a distance before the end of the section (in this case P3) such that it is then possible to decelerate to a zero speed. The state of the system corresponding to a passage point is consequently reached at the same time for each of the movements. For the slow movements, e.g., for a deburring process, the desynchronizations are relatively unimportant in practice and are generally reduced to the start of the sections T. They also do not necessarily occur after each passage point P.

A description will now be given of the way in which the dependent rotation movement is accomplished during a section.

For each machine cycle a calculation is made as a function of the orientation reached by the member of the rotation axis which would make it possible to bring said member to the passage point P, followed by a simple rotary movement. On the rotation axis of the member is then imposed a maximum acceleration evolution in order to make it converge with the calculated rotation axis. The process is performed with the aid of the following formulas.

If i designates the index of the present situation and j the index of the desired situation, a calculation firstly takes place of a rotation axis defined by its unitary vector $WC(i)$ making it possible to add a desired orientation $M(j)$ on the basis of the present orientation $M(i)$, i.e., an equation is solved which can be symbolized by $WC(i) = AXE(M(i), M(j))$, in which AXE is a programmed function in the control system.

The transition of $W(i)$ (existing rotation axis defined by its unitary vector) to $WC(i)$ in a single machine cycle for a sampling time Tech, would require an angular acceleration Sang″(i) equal to $|WC(i)-W(i)|\cdot($Sang′(i)/Tech$)$ in which Sang′(i) is the rotation speed taking place. If this acceleration Sang″(i) is obtainable, we will obtain W(i+1)=WC(i), i.e., the desired rotation axis will be reached in a single cycle and if not we will have:

$$W(i+1) = W(i) + WC(i) - W(i)/|WC(i) - W(i)| \bullet$$

•Sang″·(Tech/Sang′ (i)) in which Sang″ is the maximum acceleration.

The rotation obtained during the cycle takes place around the axis $W(i+1)/:W(i+1)|$. The new orientation can then be calculated, as well as the path which remains to be covered up to the objective. The quantities between the vertical lines correspond to the standards of these quantities.

The programming software of robots is easily usable for programming such a convergence algorithm. When the member is placed with its rotation axis at the desired orientation, it is only necessary to impose on it a single rotation about a fixed axis and then the case referred to in connection with the tool 5 will be explained.

The invention can be performed in numerous different ways and in particular with much more numerous dependent movements, which can relate to components mechanically independent of the system, such as other robots or mobile, but inert solids, such as tables, conveyors, etc. In fact this constitutes a situation when the invention can be used with particular advantage. It is also possible to envisage several dependency control instructions, i.e., certain movements, instead of being made dependent on the master movement, will be made dependent on movements dependent thereon. The maximum speed VO can be determined for various reasons: maximum advance speed of the tool 5, safety reasons, need to remain coordinated with other slower mechanisms, etc.

What is claimed is:

1. A process for generating a trajectory for a robotized system having at least one mobile member and moving the robotized system according to the trajectory, the trajectory consisting of a superimposition of movements by the one mobile member and being defined by a succession of sections joined by passage points defined by coordinates, where the system is at a given state, comprising the steps of:

selecting a main movement and a dependent movement;

reading the coordinates, when each of the sections is reached by the robotized system to become a current section, of a first passage point at which the current section begins, a second passage point at which the current section ends and a next section begins, and a third passage point at which the next section ends;

determining a target velocity of said main movement at said second passage point, said target velocity allowing the robotized system to reach said third passage point at a nil speed according to a maximal possible deceleration imposed on the robotized system between said second passage point and said third passage point;

determining a main velocity of said main movement between a previous passage point and a next passage point according to a first velocity at said previous passage point, said target velocity, and a maximal possible acceleration;

determining a dependent velocity of said dependent movement according to said main velocity so that the robotized system travels over the current section with respect to said dependent movements substantially at the same velocity with respect to said main movement; and controlling the robotized system to move the robotized system through each of the sections so that, for each section, the robotized system travels at said target velocity at a second passage point of each section, travels at said main velocity during at least a portion of the main movement, and travels at said dependent velocity during at least a portion of said dependent movement.

2. The process according to claim 1, wherein said dependent movement is made at respective maximal dependent accelerations or decelerations until the sections are travelled over by said dependent movement at said main velocity.

3. The process according to claim 1, wherein for at least some of the sections the main velocity and dependent velocity are proportional.

4. The process according to claim 1, wherein said main movement is a translational movement of said one mobile member and said dependent movement is a rotational movement of said one mobile member.

5. The process according to claim 4, wherein said one mobile member comprises a robot arm carrying a tool, said process being a deburring process in which a sinuous burr on a workpiece is removed by said tool, said dependent movement being an inclination of said tool over the burr, and said main movement corresponding to displacements along segments of the sinuous burr.

6. The process according to claim 4, wherein said rotational movement is performed within each of the sections in a series of successive cycles in which, for said one mobile member, a second axis of rotation is determined, about which said one mobile member rotates so as to reach an orientation required at the end of the section, and rotary displacements at a maximum rotational acceleration are imposed to said one mobile member so that an actual axis of rotation of said one mobile member converges to said second axis of rotation.

* * * * *